United States Patent [19]

Hayner

[11] Patent Number: 4,593,446

[45] Date of Patent: Jun. 10, 1986

[54] METHOD OF MANUFACTURING A FLUID FLOW RESTRICTOR

[76] Inventor: Paul F. Hayner, 52 Sentry La., Merrimack, N.H. 03054

[21] Appl. No.: 601,770

[22] Filed: Apr. 18, 1984

[51] Int. Cl.[4] .................. B21D 53/00; B23K 31/02; F15D 1/10
[52] U.S. Cl. .................. 29/157 R; 29/458; 29/DIG. 4; 72/186; 72/326; 137/625.28; 138/42; 228/185; 228/220; 228/173.6
[58] Field of Search .......... 29/157 R, 157.1 R, 458, 29/DIG. 4; 72/186, 325, 326; 137/625.28, 625.3; 138/37, 40, 41, 42; 228/172, 173 C, 185, 220

[56] References Cited

U.S. PATENT DOCUMENTS

| | | | |
|---|---|---|---|
| 1,449,385 | 3/1923 | Dieterich | 72/326 |
| 2,561,457 | 7/1951 | Beales et al. | 138/42 X |
| 3,453,710 | 7/1969 | Bell | 29/458 X |
| 3,688,800 | 9/1972 | Hayner et al. | 138/37 X |
| 3,787,809 | 10/1976 | Baumann | 138/42 |
| 4,279,274 | 7/1981 | Seger | 137/625.28 X |

Primary Examiner—Howard N. Goldberg
Assistant Examiner—Ronald S. Wallace

[57] ABSTRACT

The method of providing an order of magnitude manufacturing cost reduction in the manufacture of fluid flow restrictors by employing components produced by punch press stamping operations. The flow restrictor is formed of a plurality of annular plates. Half of the plates are punched to form concentric rings of tabs at right angles to one surface thereof. The plates with and without the tabs are alternately stacked concentrically and brazed together to form the fluid flow restrictor having a central core communicating with the exterior surface through a plurality of tortuous paths.

20 Claims, 17 Drawing Figures

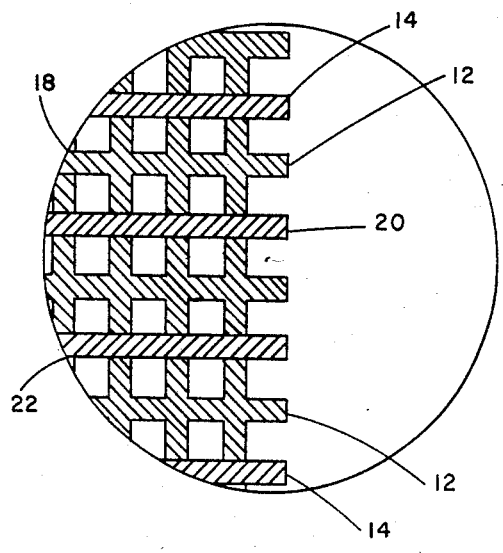 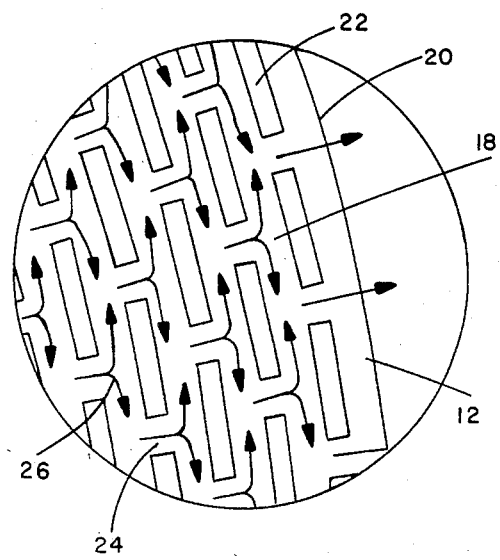
FIG. 3        FIG. 4
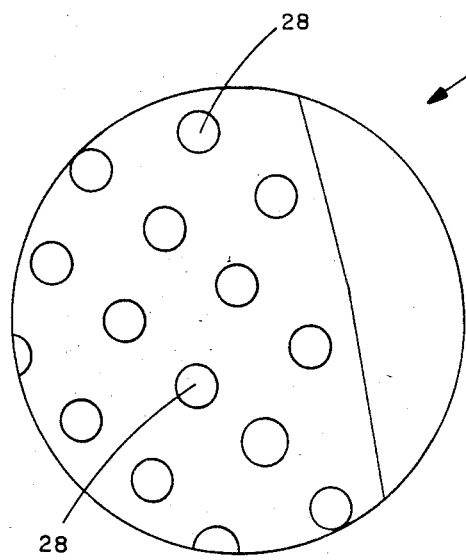 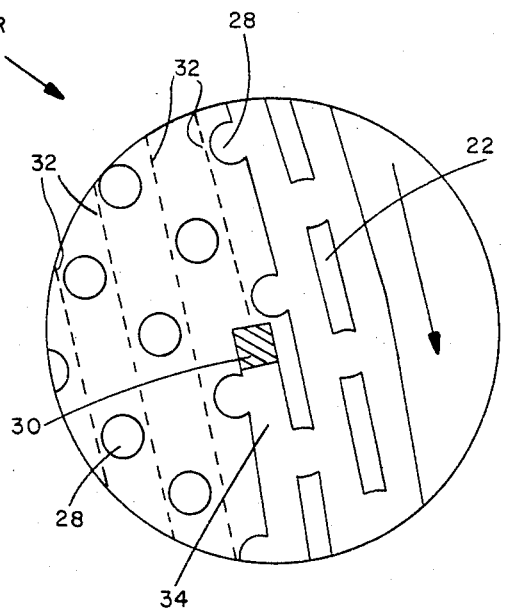
FIG. 5        FIG. 6

METHOD OF MANUFACTURING A FLUID FLOW RESTRICTOR

BACKGROUND OF THE INVENTION

The present invention relates to methods of manufacture and, more particularly, to a method for manufacturing a fluid flow restrictor by forming a plurality of plates with tabs punched therein, stacking the tabbed plates with non-tabbed plates and brazing the entire assembly to form a unitary structure having radial tortuous paths communicating between a central core and the exterior surface thereof.

Fluid flow restrictors are employed to effect a pressure drop in a hydraulic system. In one type of fluid flow restrictor as typically employed with valves used in submarines and the like wherein a low noise environment is required, a structure such as that shown in FIGS. 1–4 is employed. The restrictor, generally indicated as 10, comprises a plurality of annular machined plates 12 and flat plates 14 which are brazed together to form the hollow cylindrical structure as shown having a central bore 16 into which the fluid flows and a plurality of radial tortuous paths 18 communicating between the central bore 16 and the cylindrical exterior surface 20 from which the fluid flows out. As best seen in FIG. 4, the tortuous paths 18 comprise a plurality of separated wall members 22 lying along concentric circles wherein the space 24 between wall members 22 in one circular row is disposed opposite a wall member 22 in the next row whereby, as indicated by the arrows 26, the flow of fluid is stopped and must branch. It is this branching and the back pressures created thereby which effects the drop in fluid pressure. The construction of such a fluid flow restrictor is described in greater detail in U.S. Pat. No. Re. 29,714 entitled "Fluid Flow Restrictor" by Paul F. Hayner and Richard J. Brockway, which is also assigned to the common assignee of this application.

Such a fluid flow restrictor works well for its intended purpose providing the desired reduction in fluid pressure while creating very little detectable noise in its operation. By virtue of the nature of its construction, however, such fluid flow restrictors as presently manufactured are very expensive. The prior art method of manufacture most commonly employed is shown in FIGS. 5 and 6. The machined plates 12 (which can also be chemically etched in another costly and time-consuming process) are typically first drilled on both surfaces according to a preset pattern as shown in FIG. 5. In a typical flow restrictor as employed in a valve on a submarine, twenty-eight plates 12 are employed. Each plate 12 has approximately 2580 wall members 22 thereon. This means that 2580 holes 28 must be drilled into the surface of the machined plate 12 on each side; that is, 2580×2×28 or a total of 144,480 holes must be drilled into the surfaces of the twenty-eight plates for each restrictor 10. The plates 12 are then rotated in a lathe where a cutting tool 30 is employed to cut along the dotted lines 32 between adjacent rows of holes 28 to create channels 34 thus defining wall members 22 by removing the material around them (i.e., holes 28 and channels 34). As can be readily understood, it is easy to make an error or have a broken drill/cutting tool thereby creating an unusable plate 12 for purposes of the restrictor 10.

Wherefore, it is the object of the present invention to provide a method of manufacturing flow restrictors such as that indicated as 10 in FIGS. 1–4 which is cheaper and more reliable than the previous method of manufacture.

SUMMARY

The foregoing objective has been met by the method of the present invention comprising the steps of forming a plurality of annular first plates having an inside radius R1 and an outside radius R2; forming a plurality of annular second plates having an inside radius R1 and an outside radius R2; punching the first plates to form tabs therein defining a tortuous path where the tabs are of equal size and at right angles to one surface of the first plates, the tabs lie along circles concentric with the center of the first plates, and the tabs of each circle are equally radially spaced and disposed between a pair of the tabs in the next adjacent circle of tabs; forming a stack of the first and second plates where the plates are concentrically aligned, the tabs face the same direction, and the first and second plates are alternated; and, bonding the first and second plates and tabs together at their points of contact to form a flow restrictor of the desired design.

According to the preferred embodiment, the tabs are semicircular in shape and are ground to an equal height before assembling the stacks. The tabs are also aligned so as to form a self-supporting stack. Further, the plates are of stainless steel and the second plates are plated with a brazing metal whereby the bonding is accomplished by heating the stack and the brazing material is in sufficient quantity such that it forms fillets where the tips of the semicircular tabs contact the next adjacent plates and the like.

DESCRIPTION OF THE DRAWINGS

FIG. 3 is a detailed view of the fluid flow restrictor of FIG. 1 in the region designated as III.

FIG. 4 is a detailed view of the fluid flow restrictor of FIG. 2 in the area designated as IV.

FIG. 5 shows a portion of a plate being manufactured according to the prior art technique wherein a pattern of holes is first drilled into the surface thereof.

FIG. 6 shows the portion of the plate of FIG. 5 during the prior art process of machining grooves between the rows of holes to create the wall members thereon.

DESCRIPTION OF THE PREFERRED EMBODIMENT

The description which follows hereinafter is with respect to an actual fluid flow restrictor constructed according to the method of the present invention for commercial application on submarine valves by the assignee of this application.

Figure 1:
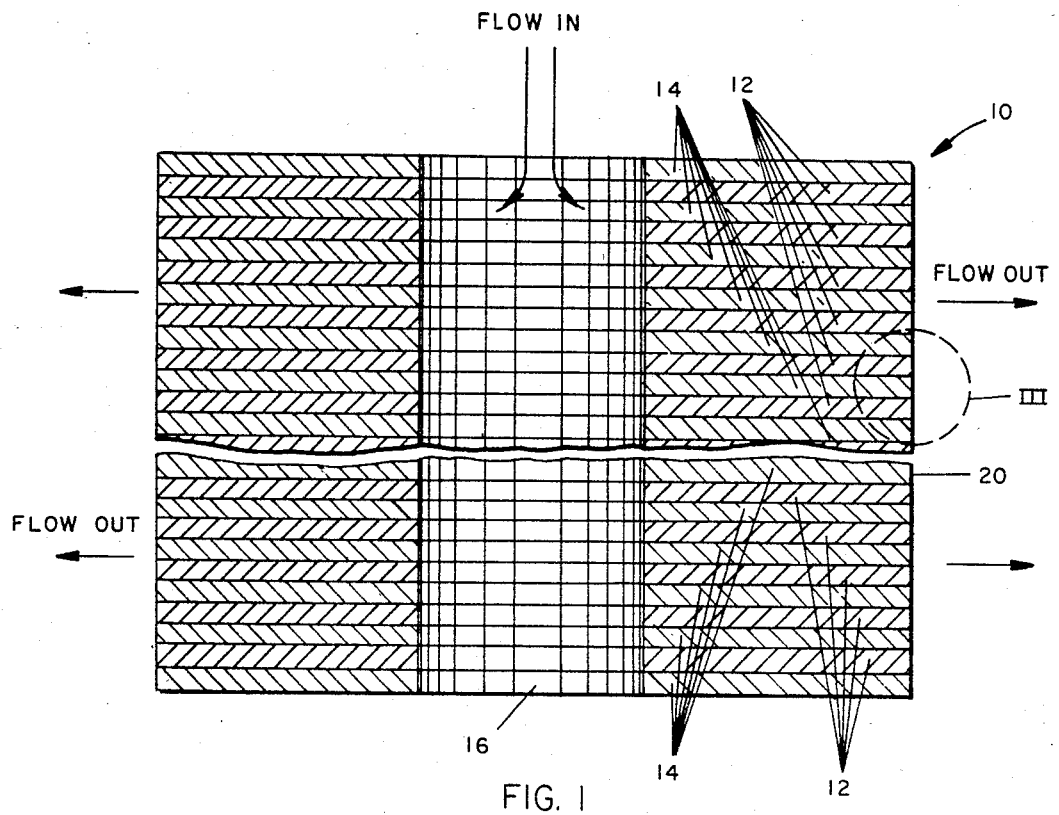
FIG. 1 is a cutaway elevation of a fluid flow restrictor as manufactured by the method of the present invention.
Figure 2:
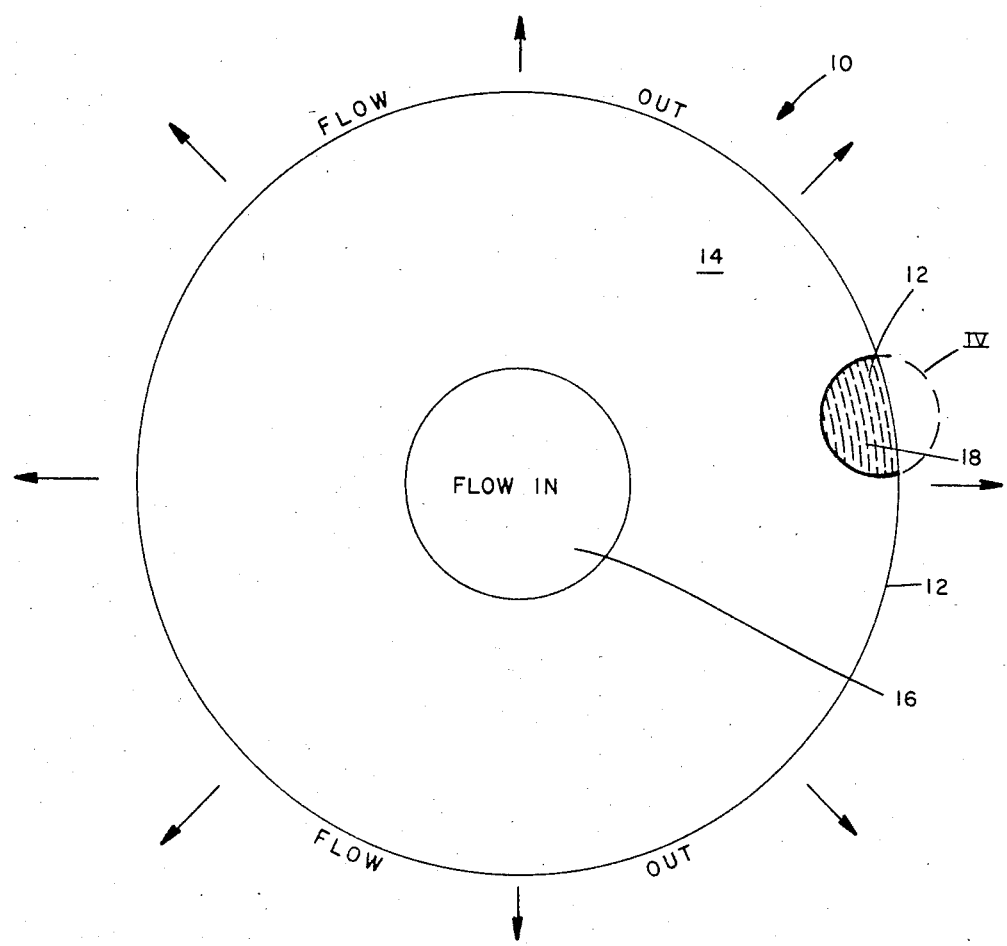
FIG. 2 is a plan view of the fluid flow restirctor of FIG. 1.

To manufacture a fluid flow restrictor such as that designated as 10 in FIG. 1 employing the method of the present invention, a plurality of annular plate blanks are first punched from 0.010" thick stainless steel. Each annular disk plate has an inner diameter R1 and an outer diameter R2. The inner diameter R1 will be the diameter of the central bore 16 of the final flow restrictor 10'. The annular plates thus formed are divided into two sets comprising a plurality of first plates 36 to be punched in a manner to be described in greater detail shortly and a plurality of second plates 46 to be prepared for brazing.

Figure 7:
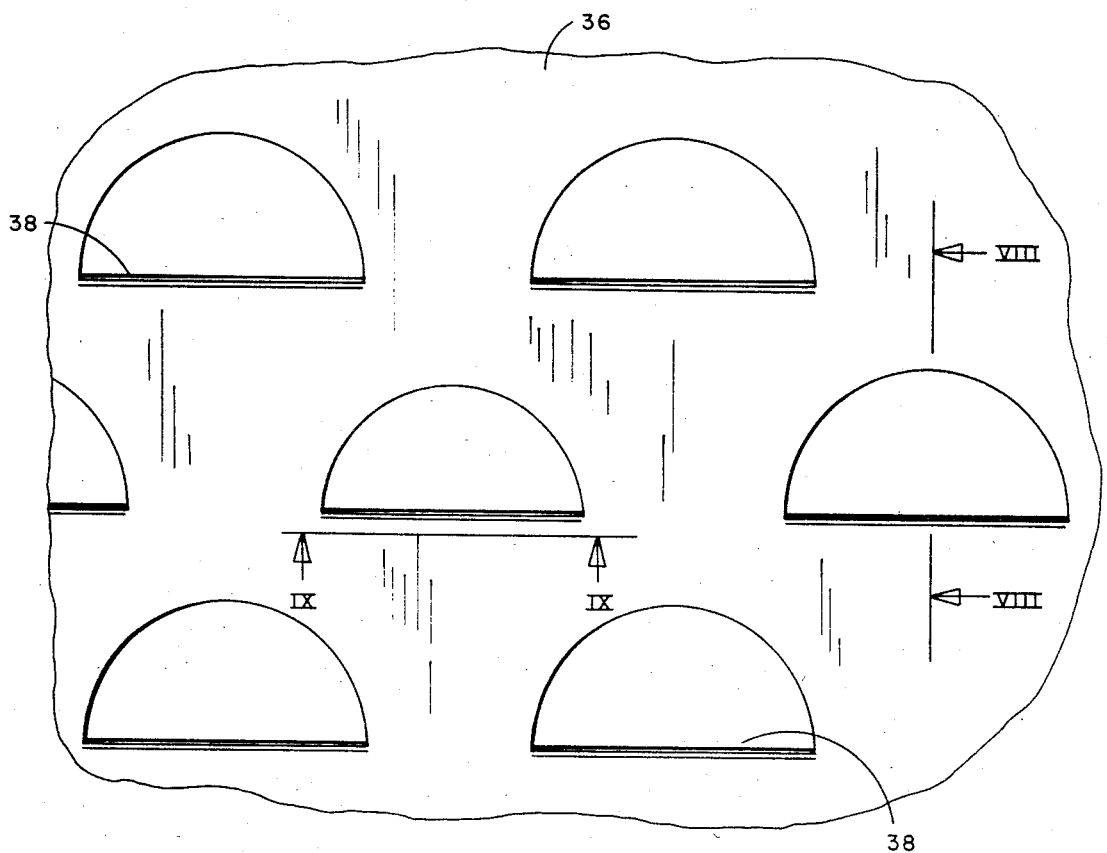
FIG. 7 is a plan view of a portion of a plate as employed in the present invention after the punching of semicircular tabs therethrough.
Figure 8:
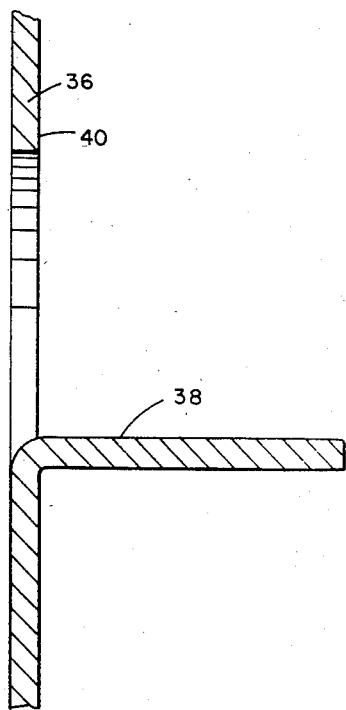
FIG. 8 is a cutaway view through one of the tabs of the plate of FIG. 7 in the plane VIII—VIII.
Figure 9:
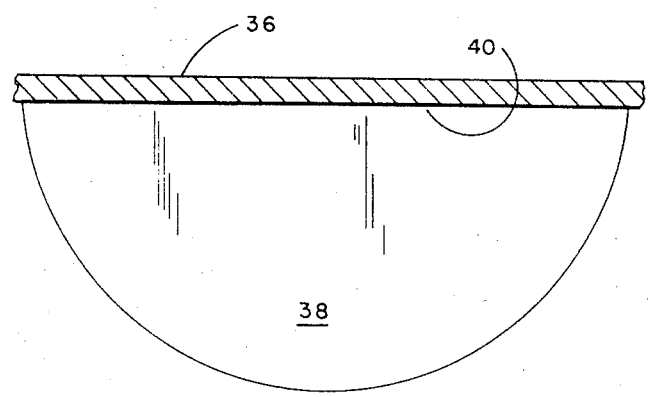
FIG. 9 is a cutaway view through the plate of FIG. 7 adjacent one of the tabs in the plane IX—IX.
Figure 10:
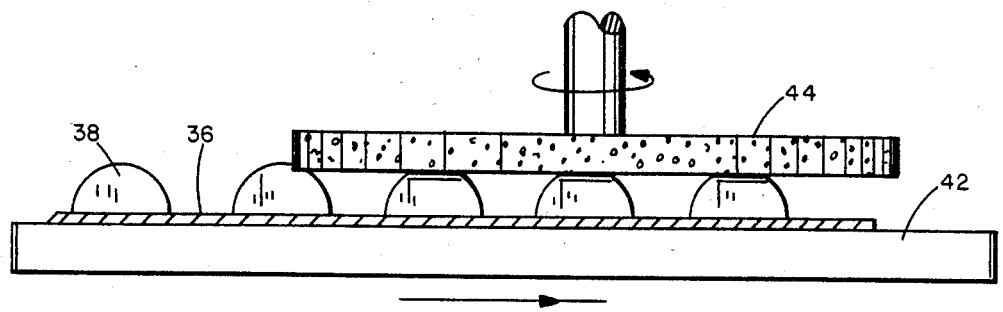
FIG. 10 is a drawing showing the step of grinding the tabs to a common and uniform height.

The first plates 36 are all punched to form semicircular tabs 38 at right angles to one surface 40 of the plates 36 as shown in FIGS. 7-9 which define a tortuous path. As can be seen, the tabs 38 are disposed in rows in the form of concentric circles where each row of tabs 38 is disposed with the individual tabs 38 thereof between tabs 38 in the next adjacent rows in the manner of the wall members 22 of the prior art previously described. In the embodiment being described, there are twenty-nine rows of punched holes 0.070" apart radially where the outer row has thirty-six punched holes or tabs 38 per quadrant and every succeeding row moving towards the center has one less punched hole/tab than the previous row until the inner row has six tabs 38 per quadrant.

Further, in the commercial embodiment being described, the punching of the tabs 38 is accomplished in four steps. The individual punch die is constructed to punch one-fourth of each quadrant's holes simultaneously. Thus, to punch all the tabs 38 in each quadrant, the die must be positioned and operated four times. The die is rotated 90° between punchings to punch all the holes and form the tabs 38 in each of the four quadrants. This process results in the punching of the required 2580 tabs 38 per first plate 36 in a more cost effective and reliable manner than attempting to punch them simultaneously.

Once the tabs 38 have been punched, the first plates 36 are mounted to a magnetic work plate 42 in order to hold the first plates 36 in a perfectly flat position while they are passed beneath a grinding wheel 44 whereby the tabs 38 are all ground to a uniform height.

Figure 11:
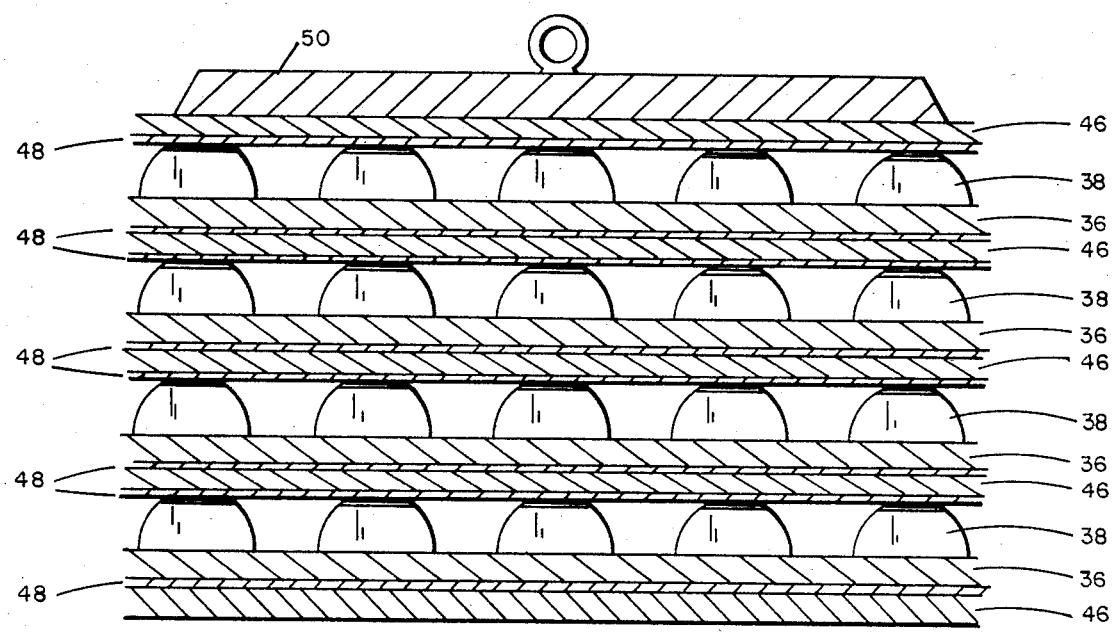
FIG. 11 shows the preferred manner of stacking the tabbed and untabbed plates prior to the step of brazing.
Figure 12:
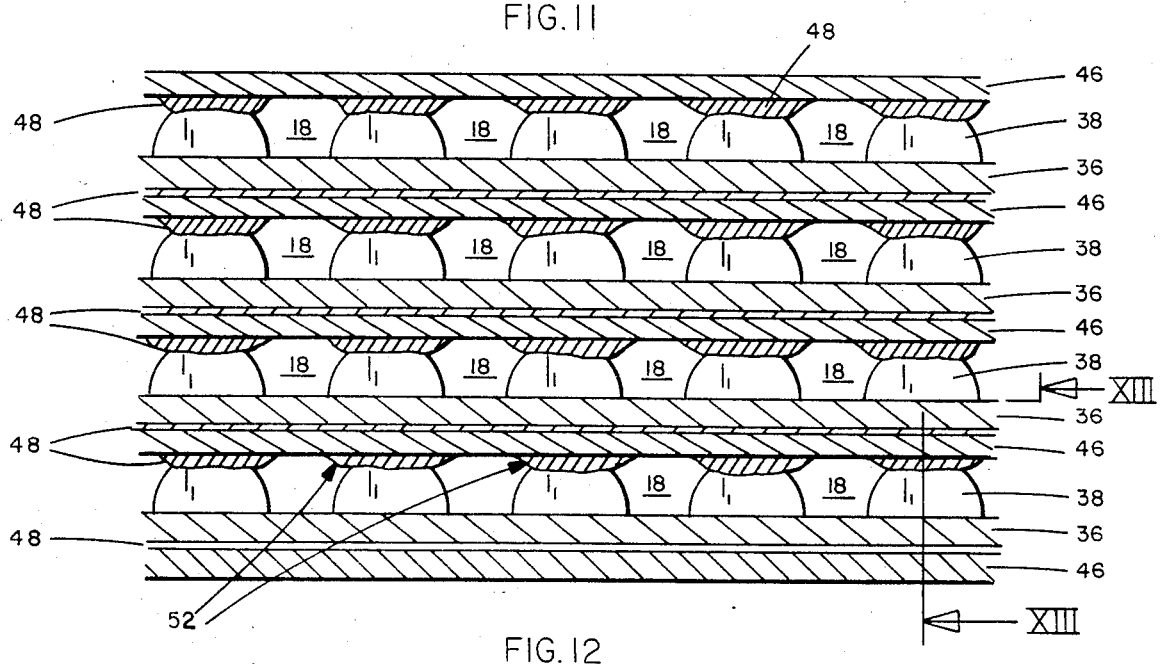
FIG. 12 is a cross section through a portion of a flow restrictor according to the present invention showing the manner in which the fillets form at the point of contact between the tabs and the next adjacent plate.
Figure 13:
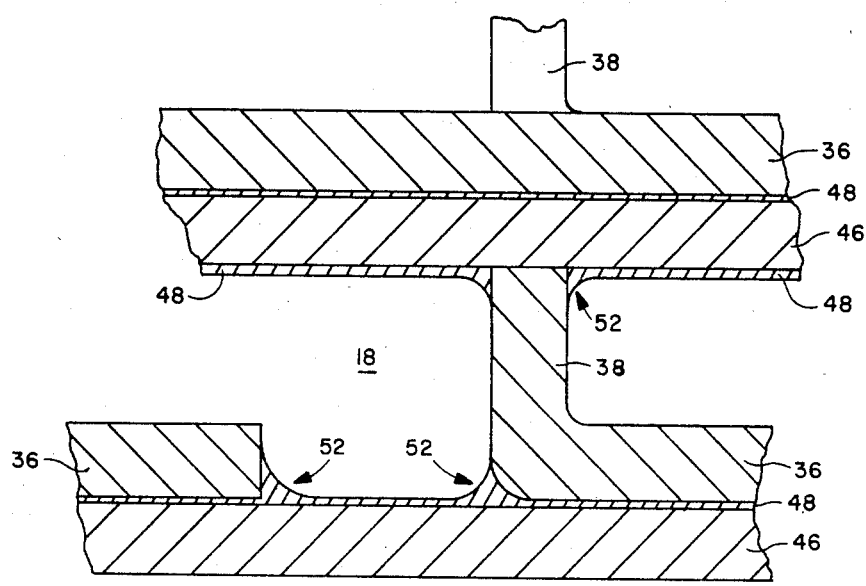
FIG. 13 is an enlarged drawing through the flow restrictor of FIG. 12 in the plane XIII—XIII.

While the first plates 36 are being thus formed, the second plates 46 are plated on either side with a coating of brazing metal 48 such as copper. The first plates 36 and second plates 46 are then alternately stacked as shown in FIG. 11 in a fixture (not shown) to hold them firmly together flat and in the desired position such as with a weight 50 as shown. In the preferred method, the tabs 38 of the various first plates 36 are stacked in longitudinal alignment. As a result the tabs 38 at corresponding positions on the plates 36 form self-supporting stacks which add strength to the whole resultant structure. The stack of first and second plates 36,46 is next heated to the brazing temperature of the metal 48 (in the embodiment being described, the brazing metal 48 was copper and, therefore, the stack was raised to the melting point of copper) which causes the plates 36,46 to be bonded together in the manner shown in FIGS. 12 and 13. Where the first plates and second plates are in contact on the surfaces opposite the tabs 38, the metal 48 merely brazes the two plates 36,46 together evenly across as shown. At points of angular contact such as at the tip of the semicircular tabs 38 and the points of cutting and bending of the tabs 38, the metal 48 on the second sheets 46 is originally plated on to sufficient thickness such that it tends to move by capillary attraction to the points of contact and form fillets such as those generally indicated as 52. The fillets 52 add both strength to the structure and smoothness to the tortuous paths 18 formed thereby.

Figure 14:
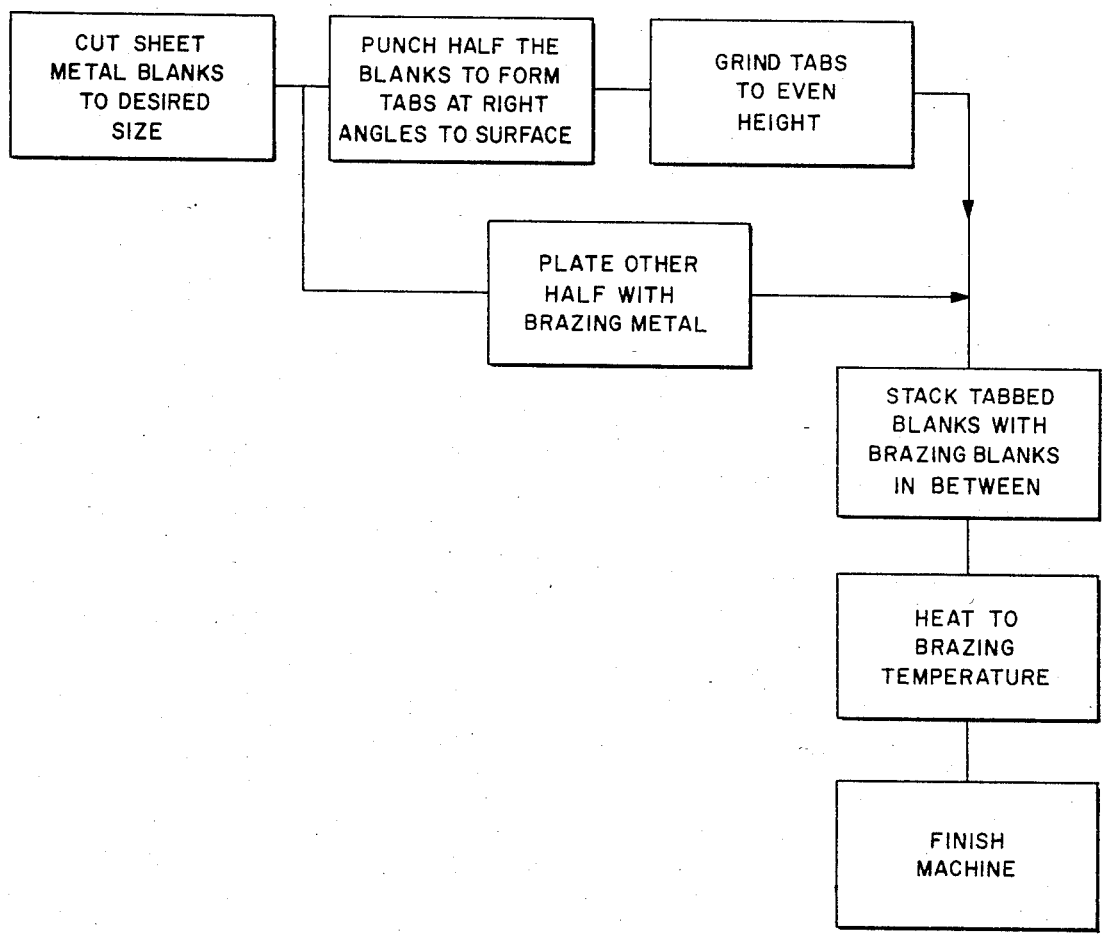
FIG. 14 is a block diagram depicting the steps of the present invention.

Thus, the steps of the present invention in its preferred embodiment can be summarized as shown in the diagram of FIG. 14. First, sheet metal is cut as through metal stamping to form a plurality of blanks of desired size and shape. In the example described, the blanks are of stainless steel and shaped as annular disks having an inside radius R1 and an outside radius R2. Half of the blanks are designated as first plates and these are punched to form semicircular tabs at right angles to the surface in a pattern defining a tortuous path. The other half of the plates are designated as second plates and are plated on both sides with brazing material such as copper. The first plates are mounted in a manner to assure their being flat such as to a magnetic plate and the tips of the tabs ground to assure that all tabs are of an even height. The first and second plates are then stacked alternately in a desired configuration such as concentrically with the tabs of the first plates being aligned with the tabs of the next adjacent first plates to form self-supporting stacks. While being held firmly together, the first and second plates are heated to a brazing temperature to melt the brazing material which bonds the plates together and the tabs to the plates to form a unitary structure having a cylindrical center bore and a plurality of tortuous paths defined by the tabs disposed radially between the center bore and the cylindrical outer surface. The resultant unitary restrictor is then finish machined as necessary to correct any minor misalignments made during the fabrication process.

As previously mentioned, the embodiment hereinbefore described is with respect to a restrictor which is to be incorporated into a submarine valve. Since that valve operates under extremely high pressures, the above-described restrictor and its method of manufacture are intended to result in a restrictor which will successfully tolerate those pressure extremes.

Figure 15:
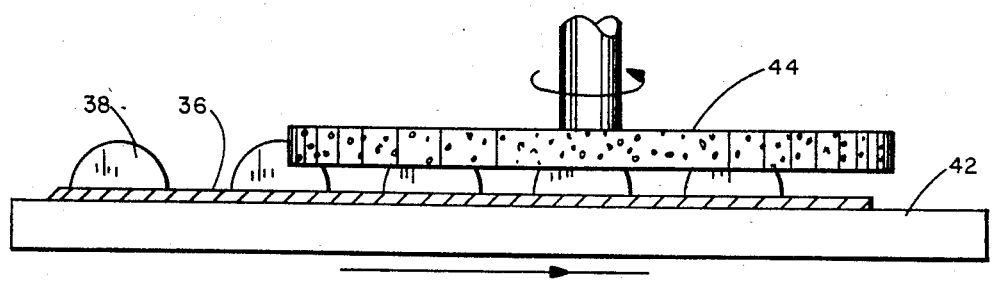
FIG. 15 shows the method of grinding in an alternate embodiment.
Figure 16:
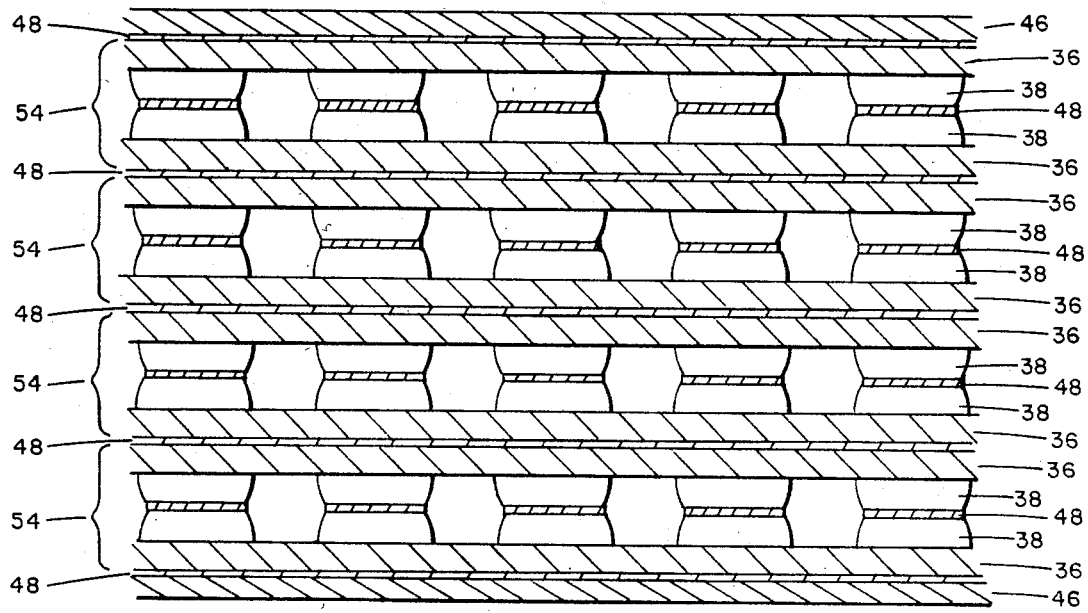
FIG. 16 shows a cross section through a restrictor being manufactured by the alternate embodiment method.

An alternate method of manufacture according to the basic technique of the present invention is shown in FIGS. 15 and 16. As depicted in FIG. 15, according to this embodiment, the semicircular tabs 38 in the grinding step are ground to about one-half their original height. Pairs of first plates 36, generally indicated as 54, are positioned in face-to-face relationship with the tabs 38 aligned and then the pairs 54 are stacked with the tabs 38 in longitudinal alignment as shown in FIG. 16. The points of contact are then bonded together. If the bonding is to be by brazing as in the preferred embodiment, a suitable brazing metal is placed between the points of contact and the entire structure heated to the appropriate brazing temperature as previously described. Unpunched second plates 46 are positioned over the two outer ends to seal the restrictor from undesired leakage through the punched holes in the two outer most first plates 36. Thin second plates 46 can be disposed between the pairs 54 if desired or can be omitted to produce a tortuous path pattern having the capability of fluid movement between adjacent pairs 54 as well as radially outward from the central bore 16 to the exterior surface 20.

It should also be noted and appreciated by those skilled in the art that the method of the present invention can be used to manufacture fluid flow restrictors having more specialized shapes for particular applications than is possible using the prior art method. Thus, instead of being limited to a cylindrical shape as produced by lathe turning, the method of the present invention can produce restrictors having cross-sectional shapes such as triangles, squares, pentagons, etc.

Figure 17:
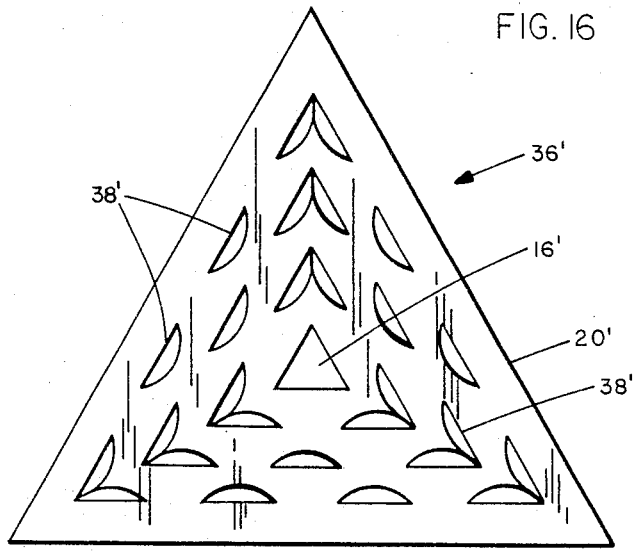
FIG. 17 is a simplified drawing of a triangular first plate which could be used in the method of the present invention.

For example, a triangular cross-sectioned fluid flow restrictor first plate 36' is shown in simplified form in FIG. 17. The central bore 16' is triangular and concentrically disposed with respect to the triangular exterior surface 20'. The tabs 38' are disposed on concentric triangular "circles" to define the desired tortuous path.

In the description hereinbefore and the claims that follow, the terms annular, circular, and the like, are intended to include these other shapes as well.

Thus, it can be seen that the method of the present invention provides a fluid flow restrictor having the same capabilities as those manufactured using prior art machining or chemical etching techniques but in a manner which is less costly and less prone to error and waste.

Wherefore, having thus described my invention, I claim:

1. The method of manufacturing a fluid flow restrictor comprising the steps of:
   (a) forming a plurality of annular first plates having an inside radius R1 and an outside radius R2;
   (b) forming a plurality of annular second plates having an inside radius R1 and an outside radius R2;
   (c) punching said first plates to form tabs therein defining a radial tortuous path wherein said tabs are of substantially equal height and substantially at right angles to the plane defined by one of said first plates, said tabs lie substantially along circles concentric with the center of said first plates and said tabs of each circle are substantially equally radially spaced and each disposed on a respective radius of the said first plate on which said respective tab is formed which radius is disposed substantially between a pair of said tabs in the next adjacent circle of said tabs;
   (d) forming a stack of said first and second plates wherein said plates are substantially concentrically aligned, said tabs are substantially longitudinally aligned and face substantially in the same direction, and said first and second plates are alternated; and,
   (e) bonding said first and second plates and tabs together at their points of contact to form a flow restrictor having a central cylindrical bore connected to an outside cylindrical surface by a plurality of radial tortuous paths.

2. The method of claim 1 and additionally comprising between steps (c) and (d) thereof the additional step of:
   (c1) grinding said tabs to assure that they are all of substantially equal height.

3. The method of claim 1 wherein said first and second plates are formed of steel and additionally comprising between steps (b) and (d) thereof the additional step of:
   (b1) plating both surfaces of said second plates with a metal suitable for brazing; and wherein said step (e) of bonding comprises,
   (e1) heating said first and second plates to a brazing temperature for said metal whereby said plates and tabs are brazed together.

4. The method of claim 3 wherein:
   said step (c) of punching comprises punching semicircular tabs; and,
   said step (b1) comprises plating with a sufficient quantity of said metal such that during said step (e1) of heating said metal flows to form fillets at the point of contact between said semicircular tabs and said second plates.

5. The method of manufacturing a fluid flow restrictor comprising the steps of:
   (a) forming a plurality of annular first plates having an inner bore of radius R1 and an outer surface of radius R2;
   (b) forming a plurality of annular second plates having an inner bore of radius R1 and an outer surface of radius R2;
   (c) punching said first plates to form tabs therein defining a plurality of radial tortuous paths between said inner bore and said outer surface wherein each tab is substantially at a right angle to the plane of said first plate in which said tab is formed;
   (d) forming a stack of said first and second plates where said first and second plates are alternated and concentrically aligned with said tabs facing in the same direction; and,
   (e) bonding said first and second plates and tabs together at their points of contact to form a flow restrictor having a central cylindrical bore connected to an outside cylindrical surface by a plurality of radial tortuous paths.

6. The method of claim 5 and additionally comprising between steps (c) and (d) thereof the additional step of:
   (c1) grinding said tabs to assure that they are all of substantially equal height.

7. The method of claim 5 wherein said first and second plates are formed of steel and additionally comprising between steps (b) and (d) thereof the additional step of:
   (b1) plating both surfaces of said second plates with a metal suitable for brazing; and wherein said step (e) of bonding comprises,
   (e1) heating said first and second plates to a brazing temperature for said metal whereby said plates and tabs are brazed together.

8. The method of claim 7 wherein:
   said step (c) of punching comprises punching semicircular tabs; and,
   said step (b1) comprises plating with a sufficient quantity of said metal such that during said step (e1) of heating said metal flows to form fillets at the point of contact between said semicircular tabs and said second plates.

9. The method of claim 5 wherein:

said step (d) of forming a stack includes the step of placing said tabs at respective positions of said first plates in longitudinal alignment.

10. The method of manufacturing a fluid flow restrictor comprising the steps of:
(a) forming a plurality of first plates of a given perimetrical shape and having a given shaped central bore therein;
(b) forming a plurality of second plates having substantially the same shape and bore as said first plates;
(c) punching said first plates to form tabs therein defining a plurality of tortuous paths extending radially between said bore and the perimeter, wherein each tab is substantially at a right angle to a plane defined by a said first plate in which said tab is formed;
(d) forming a concentrically aligned stack of said first plates;
(e) disposing ones of said second plates in concentric alignment over the ends of said stack; and,
(f) bonding said first and second plates and tabs together at their point of contact to form a flow restrictor having a central bore connected to an outside surface by a plurality of radial tortuous paths.

11. The method of claim 10 and additionally including the step of:
disposing ones of said second plates in concentric alignment between adjacent ones of said first plates in said stack before said step of bonding.

12. The method of claim 10 wherein:
said step of forming said stack includes facing said tabs in the same direction and placing them in longitudinal alignment.

13. The method of claim 10 and additionally comprising the step of:
grinding said tabs to assure that they are all of substantially equal height.

14. The method of claim 11 wherein said first and second plates are formed of steel and additionally comprising the step of:
plating both surfaces of said second plates with a metal suitable for brazing; and wherein,
said step of bonding comprises heating said first and second plates to a brazing temperature for said metal whereby said plates and tabs are brazed together.

15. The method of claim 14 wherein:
said step of punching comprises punching semicircular tabs; and,
said step of plating comprises plating with a sufficient quantity of said metal such that during said step of heating said metal flows to form fillets at the point of contact between said semicircular tabs and said second plates.

16. The method of claim 10 wherein said stacking step comprises:
(d1) forming a plurality of first plate pairs each having two of said first plates in tab-to-tab aligned facing relationship; and,
(d2) forming a stack of said first plate pairs.

17. The method of claim 16 and additionally including the step of:
disposing ones of said second plates in concentric alignment between adjacent ones of said first plate pairs.

18. The method of claim 16 and additionally comprising the step of:
grinding said tabs to a substantially equal height about one-half their punched height.

19. The method of manufacturing a fluid flow restrictor comprising the steps of:
(a) forming a plurality of annular steel first plates having an inside radius R1 and an outside radius R2;
(b) forming a plurality of annular steel second plates having an inside radius R1 and an outside radius R2;
(c) punching said first plates to form semicircular tabs therein defining a tortuous path wherein said tabs are of substantially equal height and substantially at right angles to the plane of said first plates, said tabs lie substantially along circles concentric with the center of said first plates and said tabs of each circle are substantially equally radially spaced and azimuthally disposed substantially between a pair of said tabs in the next adjacent circle of said tabs;
(d) grinding said tabs to assure that they are all of equal height;
(e) plating both surfaces of said second plates with a metal suitable for brazing;
(f) forming a stack of said first and second plates where said plates are concentrically aligned, said tabs are longitudinally aligned and face in the same direction, and said first and second plates are alternated; and,
(g) bonding said first and second plates and tabs together at their points of contact to form a flow restrictor having a central cylindrical bore connected to an outside cylindrical surface by a plurality of radial tortuous paths by heating said first and second plates to a brazing temperature for said metal whereby said plates and tabs are brazed together.

20. The method of claim 19 wherein:
said plating step comprises plating with a sufficient quantity of said metal such that during said step of bonding by heating said metal flows to form fillets at the point of contact between said semicircular tabs and said second plates.

* * * * *